United States Patent [19]

Griffiths et al.

[11] 4,098,795

[45] Jul. 4, 1978

[54] METHOD FOR THE PREPARATION OF X-FORM METAL FREE PHTHALOCYAMINE

[75] Inventors: Clifford H. Griffiths, Penfield, N.Y.; Richard C. Keezer, Los Altos, Calif.

[73] Assignee: Xerox Corporation, Stamford, Conn.

[21] Appl. No.: 308,914

[22] Filed: Nov. 22, 1972

[51] Int. Cl.² .............................................. C09B 47/04
[52] U.S. Cl. .................................................. 260/314.5
[58] Field of Search ...................................... 260/314.5

[56] References Cited

U.S. PATENT DOCUMENTS

| | | | |
|---|---|---|---|
| 2,195,984 | 4/1940 | Dent | 260/314.5 |
| 2,214,469 | 9/1940 | Linstead | 260/314.5 |
| 2,277,629 | 3/1942 | Bradbrook et al. | 260/314.5 |
| 2,288,478 | 6/1942 | Nadler | 260/314.5 |
| 2,290,906 | 7/1942 | Coffey | 260/314.5 |
| 2,300,572 | 11/1942 | Hoyer et al. | 260/314.5 |
| 2,413,191 | 12/1946 | Palmer et al. | 260/314.5 |
| 2,706,199 | 4/1955 | Brentano | 260/314.5 |
| 2,759,950 | 8/1956 | Tartter | 260/314.5 |
| 3,708,293 | 1/1973 | Brach et al. | 260/314.5 |

OTHER PUBLICATIONS

Moser et al., Phthalocyanine Compounds, pp. 23–28 (1963).

*Primary Examiner*— John D. Randolph

[57] ABSTRACT

A method for the preparation of X-form metal-free phthalocyanine and X-form metal-free compounds which comprises heating any metal-free phthalocyanine polymorph or compound to from about 540° to about 580° C and cooling the resulting product formed thereby is herein disclosed.

9 Claims, No Drawings

METHOD FOR THE PREPARATION OF X-FORM METAL FREE PHTHALOCYAMINE

BACKGROUND OF THE INVENTION

This invention relates to phthalocyanine photoconductive materials and, more particularly, to a novel process for the preparation of X-form metal-free phthalocyanine.

It is known that images may be formed and developed on the surface of certain photoconductive materials by electrostatic means. The basic xerographic process, as taught by Carlson in U.S. Pat. No. 2,297,691, involves uniformly charging a photoconductive insulating layer and then exposing the layer to a light-and-shadow image which dissipates charge on the portions of the layer which are exposed to light. The electrostatic image formed on the layer corresponds to the configuration of the light-and-shadow image. This image is rendered visible by depositing on the imaged layer a finely divided developing material comprising a colorant called a toner and a toner carrier. The powder developing carrier will normally be attracted to those portions of the layer which retain a charge, thereby forming a powder image corresponding to the latent electrostatic image. This powder image may then be transferred to paper and other receiving surfaces. The paper then will bear the powder image which may subsequently be made permanent by heating or other suitable fixing means. The above general process is also described in U.S. Pat. Nos. 2,357,809; 2,891,011, and 3,079,342.

It has recently been found that an especially sensitive electrophotographic plate may be prepared by mixing metal-free phthalocyanine in a binder, coating the mixture onto a conductive substrate and hardening the binder. Electrophotographic plates comprising phthalocyanines in a binder are described in detail in copending application Ser. No. 518,450, now abandoned, filed Jan. 3, 1966. It was found that an especially sensitive form of metal-free phthalocyanine could be prepared by extended dry milling or grinding of alpha or beta form metal-free phthalocyanine. This highly sensitive material was found to be a new polymorphic form of phthalocyanine. This new polymorph, now referred to as "X-form" phthalocyanine is described in detail and claimed in U.S. Pat. No. 3,357,989. While the X-form phthalocyanine produced by grinding or milling has excellent physical properties, this method of preparation has several disadvantages. In order to arrive at a complete conversion of alpha or beta metal-free phthalocyanine to the corresponding X-form phthalocyanine often requires very extended periods of milling, often over 100 hours. Besides being time consuming, this process consumes a large amount of power and requires large and sometimes complex milling equipment. Moreover, impurities may be introduced into the phthalocyanine dispersion from the metallic or ceramic milling equipment. It is very difficult to predict the milling time or total work required in a particular milling machine to insure complete conversion to X-form phthalocyanine. When changes are made in milling equipment or techniques, test runs must be made with frequent sampling and X-ray or infrared examination to detect when complete conversion has been attained.

In copending application Ser. No. 566,839, now abandoned a second method for the preparation of X-form phthalocyanine is disclosed and claimed. This method comprises mixing the alpha crystalline form of metal-free phthalocyanine with a portion of the X-form and an aliphatic organic solvent, and maintaining the mixture until the alpha form is converted to the X-form. While the X-form phthalocyanine produced by this method, like the X-form material produced by grinding or milling, has excellent physical properties, there is also several disadvantages associated with said method. For example, in order to obtain complete conversion of alpha to X-form a time period of at least 16 hours is required. Aside from being very time consuming, this process proves expensive on a large scale production of X-form phthalocyanine, wherein great amounts of aliphatic organic solvents are consumed. Further, one must employ alpha metal-free phthalocyanine, rather than the corresponding beta form, as a starting component, in order to arrive at the resulting X-form. While it is true that beta metal-free phthalocyanine may be converted to alpha metal-free polymorph by dissolving it in 98% sulfuric acid solution and precipitating the solution in ice water, this conversion technique proves both difficult and expensive. Sulfuric acid tends to degrade phthalocyanine resulting in the formation of phthalimide, phthalic acid, and various nitrogen containing compounds which are intolerable in an electrophotographic system. Moreover, since it is difficult to extract sulfuric acid from the reprecipitated phthalocyanine, it is probable that there is a continuous degradation of the phthalocyanine due to residual acid.

Copending application Ser. No. 755,411, now abandoned filed in the U.S. Patent Office Aug. 30, 1968, discloses a method of preparing X-form metal-free phthalocyanine which comprises the steps of mixing phthalonitrile in an ammonia-saturated alkylalkanolamine solvent, seeding the mixture with a catalytic amount of X-form phthalocyanine, heating said mixture to reflux temperature and maintaining said temperature for about 20 to about 70 minutes, and filtering the hot reaction product formed thereby. While this particular method is faster in time than the two previously discussed methods, it has the disadvantage of requiring several steps and relatively costly solvents and other starting materials. Copending application, Ser. No. 756,362, now abandoned filed in the U.S. Patent Office Aug. 30, 1968, discloses and claims still another method of preparing X-form metal-free phthalocyanine which comprises sublimating any metal-free phthalocyanine polymorph under a pressure of about $10^{-1}$ to about $10^{-6}$ Torr. This method, while quite fast and while producing a high yield of substantially pure X-form metal-free phthalocyanine, requires the use of complex and expensive evaporation equipment, especially when it is desired to industrially prepare X-form metal-free phthalocyanine on large scale.

Since large quantities of X-form metal-free phthalocyanine of high purity may be needed for electrophotographic or other uses, there is a continuing need for a simpler, cheaper, less time consuming, and more reproducible method of preparing same.

It is, therefore, an object of this invention to provide a method of preparing X-form metal-free phthalocyanine and phthalocyanine compounds devoid of the above-noted disadvantages.

Another object of this invention is to provide a one-step direct method for the preparation of X-form metal-free phthalocyanine and phthalocyanine compounds.

Still another object of this invention is to provide a method of preparing substantially pure X-form metal-free phthalocyanine and phthalocyanine compounds wherein the yield of the resulting product is very high.

It is yet another object of this invention to provide a simple and extremely rapid method of preparing X-form metal-free phthalocyanine and phthalocyanine compounds.

A further object of this invention is to provide a reliable and dependable method of preparing X-form metal-free phthalocyanine and phthalocyanine compounds which gives highly reproducible results.

Yet another object of this invention is to provide a method of preparing X-form metal-free phthalocyanine and phthalocyanine compounds which requires inexpensive heating and cooling techniques.

Another further object of this invention is to provide an economical method of preparing X-form metal-free phthalocyanine and when it is to be produced on a large scale industrial level.

SUMMARY OF THE INVENTION

The foregoing objectives, and others, are accomplished in accordance with this invention, generally speaking, by providing a novel system for the preparation of X-form metal-free phthalocyanine and phthalocyanine compounds which comprises heating any metal-free phthalocyanine polymorph to from about 540° C to about 580° C and then, preferably, rapidly cooling preferably to from about 10° C to about 40° C in order to avoid decomposition of the X-form product. The principal advantages associated with the above method are that inexpensive industrial heating and cooling techniques may be employed for large scale production, purity is insured, yields are very high, the method gives highly reproducible results, among others.

Phthalocyanine itself is:

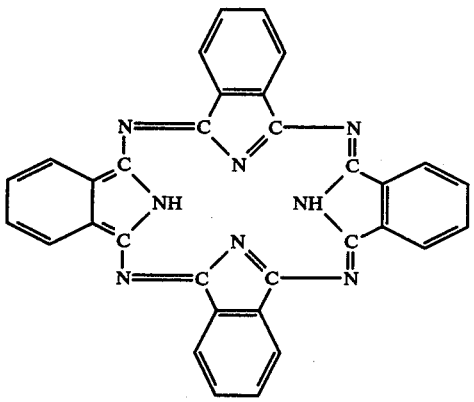

The phthalocyanine class of compounds includes metal derivatives of phthalocyanine. The two hydrogen atoms in the center of the molecule may be replaced by metals from every group of the periodic table to form the group of compounds known as the metal phthalocyanines. More than 40 such metal phthalocyanines have been prepared. Also from 1-16 of the peripheral hydrogen atoms in the four benzene rings in the phthalocyanine molecule have been replaced by halogen atoms and by numerous organic and inorganic groups. Several thousand different phthalocyanine compounds have thus been synthesized.

All phthalocyanine compounds absorb light on both sides of the blue-green portion of the visible spectrum. Therefore, "phthalocyanine" is an apt nomenclature for all members of the phthalocyanine class. In the art, phthalocyanine is known to embrace both specifically the molecule and the class of metal and metal-free and peripherally substituted phthalocyanines. Therefore, for purposes of the instant application, the term "phthalocyanine" shall define the molecule itself, the terms "metal" and "metal-free", where employed, shall indicate centrally metal substituted or centrally unsubstituted phthalocyanine molecules respectively. The term "phthalocyanine compound", where employed, shall indicate that phthalocyanine molecule itself is peripherally substituted. Therefore, a typical designation of a phthalocyanine compound would be as follows: an alpha metal-free phthalocyanine compound which defines the alpha form of metal-free peripherally substituted phthalocyanine. On the other hand, alpha metal phthalocyanine defines an alpha form phthalocyanine which is metal centrally substituted and not peripherally substituted.

Any suitable metal-free phthalocyanine or phthalocyanine compound may be used as a starting material of this invention. Metal-free phthalocyanine is known to exist in several different polymorphic forms which may be easily distinguished by comparison of their X-ray diffraction patterns and/or infrared spectra. Further, the color of the pigment varies according to the polymorphic form, the beta form being, in general, greener than the alpha or gamma forms. The alpha, beta, and gamma forms of metal-free phthalocyanine are described by C. Hammon and M. Starke in "Investigation of the Electrical and Thermal-Electric Properties of the Modification of Metal-Free Phthalocyanine," Phys. Stat. Vol. 4, 509 (1964). Several different forms of phthalocyanine polymers are known. Many of these phthalocyanine-containing polymers are described in "Phthalocyanine Compounds" by F. H. Moser and A. L. Thomas, Rheinhold Publishing Company, New York (1963). While any suitable metal-free phthalocyanine or phthalocyanine compound may be used as the starting material of the present invention, it is highly preferable to employ the alpha or beta form in order to obtain a high yield of extremely pure X-form metal-free phthalocyanine in a minimum amount of time.

Although the starting material of the present invention may be heated to any suitable temperature, a temperature of about 540° C to about 580° C is found convenient. It is, however, preferred to heat said starting material to a temperature of about 560° C. Differential thermal analysis data exhibits an exothermic peak at about 561° C following closely on an endothermic change initiated at about 555° C. It is the exothermic peak which is associated with the formation of X-form metal-free phthalocyanine. Further, when the starting material is heated to about 560° C prior to cooling, exceptionally high yields of a substantially pure X-form metal-free polymorph are obtained.

While any suitable heating rate may be employed in heating the starting material of the present invention, a rate of about 10° C/minute to about 60° C/minute is found convenient. However, it is preferred to employ a heating rate of about 20° C/minute in order to obtain especially high yields of the X-form metal-free phthalocyanine and phthalocyanine compounds.

After heating the starting material, the resulting X-form phthalocyanine product should be rapidly cooled to a suitable temperature, as for example to a temperature of between about 10° C and about 40° C, in order to avoid decomposition. While the material may be rapidly cooled to any suitable temperature, best results are obtained when the material is rapidly cooled to about 25° C.

While any suitable cooling rate may be employed in cooling the heated material, a rate of about 20° C/minute to about 200° C/minute works particularly well. It is preferred, however, to employ a cooling rate of about 100° C/minute in order to produce especially high yields of a substantially pure final product.

DESCRIPTION OF THE PREFERRED EMBODIMENTS

The following examples will further define various preferred embodiments of the present invention. Parts and percentages are by weight unless otherwise specified.

The resulting product produced in each of the following examples is analyzed by conventional X-ray and infrared analysis methods. The X-ray and infrared curves produced by the materials prepared in each of the following examples is compared to curves for known alpha, beta, and X-form phthalocyanine and phthalocyanine compounds as described in detail in the above-mentioned U.S. Pat. No. 3,357,989.

EXAMPLE I

About 100 g. of beta-form metal-free phthalocyanine are placed in a quartz tube equipped with a thermometer and gas inlet tube. The starting material is then heated uniformly at a rate of about 20° C/minute to about 560° C by passing heated nitrogen through the phthalocyanine powder. The material is then rapidly cooled, using nitrogen gas cooled at about −200° C, at a rate of about 100° C/minute, until the final material reaches a temperature of about 25° C. Analysis indicates conversion to X-form metal-free phthalocyanine — yield, about 95%.

EXAMPLE II

The process of Example I is repeated using alpha metal-free phthalocyanine as the starting material. Essentially the same results as in Example I are obtained.

EXAMPLE III

As a control for the process of Example I, the starting material (beta phthalocyanine) is heated to about 530° prior to cooling. No conversion to the X-form takes place.

EXAMPLE IV

As a further control for the process of Example I, the starting material is heated to about 600° C prior to cooling. Analysis indicates total decomposition of the X-form polymorph.

EXAMPLE V

As a control for the process of Example II, the starting material (alpha phthalocyanine) is heated to about 400° C prior to cooling. No conversion to the X-form occurs; rather there is a conversion to the beta polymorph.

EXAMPLE VI

About 50 g. of metal-free alpha phthalocyanine are placed on a steel plate and heated, using a Bunsen Burner, to a temperature of about 560° C. The resulting product is then allowed to cool in the atmosphere. Analysis indicates about a 20% yield of X-form metal-free phthalocyanine.

While specific components of the present system are defined in the working examples above, any of the other typical materials or temperatures indicated above may be substituted in said working examples if appropriate. In addition, many other variables may be introduced in the present process, such as further purification steps or other reaction components which may in any way affect, enhance, or otherwise improve the present process.

While various specifics are cited in the present application, many modifications and ramifications will occur to those skilled in the art upon a reading of the present disclosure. These are intended to be encompassed within the scope of this invention.

What is claimed is:

1. A method of preparing X-form metal-free phthalocyanine which comprises heating a metal-free phthalocyanine polymorph to from about 540° C to about 580° C and allowing said polymorph to cool.

2. The method of claim 1 wherein the X-form product formed as a result of said heating is rapidly cooled to from about 10° C to about 40° C.

3. The method of claim 1 wherein said metal-free phthalocyanine polymorph is heated to about 560° C.

4. The method of claim 1 wherein said metal-free phthalocyanine polymorph is cooled to about 25° C after heating.

5. The method of claim 1 wherein said metal-free phthalocyanine polymorph is heated uniformly at a rate of about 10° C/minute to about 60° C/minute.

6. The method fo claim 1 wherein said metal-free phthalocyanine polymorph is heated at a rate of about 20° C/minute.

7. The method of claim 1 wherein the X-form product formed as a result of said heating is cooled at a rate of about 20° C/minute to about 200° C/minute.

8. The method of claim 1 wherein the X-form product formed as a result of said heating is cooled at a rate of about 100° C/minute.

9. A method of preparing X-form metal-free phthalocyanine which comprises heating a metal-free phthalocyanine polymorph to from about 540° C to about 580° C and allowing said polymorph to cool, said metal-free phthalocyanine polymorph being selected from the group consisting of alpha form, beta-form and mixtures thereof.

* * * * *